(12) United States Patent
Matta et al.

(10) Patent No.: US 7,245,915 B2
(45) Date of Patent: *Jul. 17, 2007

(54) LAYER THREE QUALITY OF SERVICE AWARE TRIGGER

(75) Inventors: Johnny M. Matta, San Jose, CA (US); Atsushi Takeshita, Sunnyvale, CA (US)

(73) Assignee: NTT Docomo, Inc., Tokyo (JP)

( * ) Notice: Subject to any disclaimer, the term of this patent is extended or adjusted under 35 U.S.C. 154(b) by 997 days.

This patent is subject to a terminal disclaimer.

(21) Appl. No.: 09/965,437

(22) Filed: Sep. 27, 2001

(65) Prior Publication Data

US 2003/0069018 A1 Apr. 10, 2003

(51) Int. Cl.
*H04Q 7/20* (2006.01)
(52) U.S. Cl. .................. 455/436; 455/437; 455/438; 455/439; 370/331
(58) Field of Classification Search .......... 455/436, 455/437, 438, 439, 440, 441, 442, 445; 370/331, 370/351, 235, 352, 395.31
See application file for complete search history.

(56) References Cited

U.S. PATENT DOCUMENTS

| | | | |
|---|---|---|---|
| 5,991,634 A * | 11/1999 | Hui et al. | 455/513 |
| 6,314,098 B1 * | 11/2001 | Masuda et al. | 370/392 |
| 6,678,264 B1 * | 1/2004 | Gibson | 370/352 |
| 2004/0196808 A1 * | 10/2004 | Chaskar et al. | 370/331 |

FOREIGN PATENT DOCUMENTS

JP 2004-533790 A 11/2004

OTHER PUBLICATIONS

ETSI TR 101 329-6 V1.1.1 (2000-7) Technical Report, "Telecommunications and Internet Protocol Harmonization Over Networks (TIPHON) End to End Quality of Service in TIPHON Systems Part 6: Actual measurements of network and terminal characteristic and performance parameters in TIPHON networks and their influence on voice quality."
Perkins, C. (Editor), "IP Mobility Support," Request for Comments 2002, Oct. 1996.
3rd Generation Partnership Project, Technical Specification Group Core Network, "Handover Procedures," 3GPP TS 23.009 v4.0.0, Mar. 2001.
3rd Generation Partnership Project, Technical Specification Group Services and System Aspects; ANSI-C code for the Adaptive Multi Rate speech codec, 3G TS 26.073, version 3.10.0, Mar. 2000.
ITU-T P.800 Recommendation P.800 (Aug. 1996)—Methods for subjective determination of transmission quality.
DeCarolis, A., Dell'Uomo, L., Pugini, F., "QoS Aware Handover for Mobile IP: Secondary Home Agent," University of Rome "La Sapienza", Apr. 2000, Internet Draft —work in progress Apr. 2001 (draft-decarolis-qoshandover-02.txt).

* cited by examiner

*Primary Examiner*—Melur Ramakrishnaiah
(74) *Attorney, Agent, or Firm*—Blakely, Sokoloff, Taylor & Zafman LLP

(57) ABSTRACT

A method for providing a triggering mechanism in an all-IP wireless communication system. A plurality of communication paths are established between a mobile terminal and a correspondent node to obtain at least one QoS parameter associated with each communication path. Each communication path that provides a predetermined acceptable level of performance is then identified. A handoff trigger is then generated to the communication path that provides the highest level of performance to the mobile terminal.

26 Claims, 2 Drawing Sheets

LAYER THREE QUALITY OF SERVICE AWARE TRIGGER

FIELD OF THE INVENTION

The present invention relates generally to triggers used by wireless communication devices while communicating over a wireless communication network and, more particularly, to a layer three quality of service (QoS) aware trigger that improves the QoS provided to a wireless communication device.

BACKGROUND OF THE INVENTION

Digital data networks have become a ubiquitous part of business, commerce, and personal life throughout the United States and the world. The public Internet and private local and wide area networks (LANs and WANs) have become increasingly important backbones of data communication and transmission. Email, file access and sharing, and services access and sharing are but a few of the many data communication service and applications provided by such networks. Recently, next generation data communication applications such as Voice over IP (VoIP) and real-time interactive multi-media have also begun to emerge.

The Internet and nearly all digital data networks connected to it today adhere to substantially the same addressing and routing protocols specified in a "network layer" or "layer 3." According to these protocols, each node in the network has a unique address, called the Internet Protocol (IP) address. To communicate digital data over the network or between networks, a sending or source node subdivides the data to be transmitted into "packets." The packets include the data to be transmitted, the IP addresses of the source node and the intended destination node, and other information specified by the protocol. A single communication of data may require multiple packets to be created and transmitted depending on the amount of data being communicated and other well-known factors.

This approach introduces certain time considerations into the data communications process. Such time considerations arise for a number of reasons, including delays in the arrival of packets (latency) and delays due to the reconstruction of the signal because of variable inter-packet arrival time (packet jitter). For example, packets may be delayed in arrival if a specified or selected transmission route is interrupted due to problems (congestion) at an intermediary node. In such cases, further transmission may await resolution of the congestion at the intermediary node, which may result in even further delay. At the destination node, a certain amount of overhead is involved in processing packets in order to reconstruct their original sequence. Such overhead may increase substantially when a particular data communication involves a large number of packets, for example, or when the destination node is experiencing heavy processor loads due to other factors. In addition, it is possible for packets to be lost en route and to never reach the intended recipient node (packet loss). Further, since links are not dedicated and resources are shared, there are no guarantees of bandwidth availability.

VoIP provides real-time, interactive end-to-end voice communications over IP digital data networks using standard telephony signaling and control protocols. In VoIP, voice signals are converted to digital format, packetized, transmitted, and routed over the IP network from a source node to a destination node using the commonly used Internet protocols. At the destination, the packets are reassembled, and the voice signals reconstructed for play back. In VoIP, packet latency manifests itself as delay between the time one party to a conversation speaks and another party to the conversation hears what the speaker said. Delays that exceed a threshold and interfere with the ability to converse without substantial confusion are unacceptable. It has been demonstrated that one way packet latency in the range of 0 ms to about 150 msec results in excellent to good communication quality, whereas latency above about 150 msec results in poor to unacceptable quality.

Packets lost during transmission also adversely impact the quality of VoIP communications. It has been demonstrated that speech becomes unintelligible if voice packets comprising more than about 60 ms of digitized speech data are lost. Packets can be lost in transmission for three reasons: (1) if the electrical signal suffers from an electromagnetic disturbance, thus causing an error in one or more bits or (2) if the queue it is waiting in for transmission at some intermediary router along the path overflows due to congestion, thus causing packet dropping or (3) because of some configuration errors that cause packet transmission collisions (i.e., two or more electrical transmission signals overlapping and jamming each other). Because VoIP is a real-time interactive data communications application the current Internet protocols that provide for retransmission are of little help in this instance since late packets may become outdated, i.e., useless, when the packets finally arrive.

Packet jitter also substantially affects the quality of VoIP communications. In VoIP, packet jitter may result in the inability to reassemble all packets within time limits necessary to meet minimum acceptable latency requirements. As a consequence, sound quality can suffer due to the absence of some packets in the reassembly process, i.e., loss of some voice data or excessive packet delay. It has been determined that to achieve acceptable voice quality, voice packet inter-arrival times (i.e., jitter) generally must be limited to about 50–75 msec. Within this range, data buffering can be used to smooth out jitter problems without substantially affecting the overall quality of the voice communications.

Additionally, the current Internet addressing and routing protocols and approaches for fixed node data networks are incapable of supporting the dynamically changing addressing and routing situations that arise in recently proposed wireless, mobile-access digital data networks. The International Telecommunication Union (ITU) of the Internet Society, the recognized authority for worldwide data network standards, has recently published its International Mobile Communications-2000 (IMT-2000) standards. These standards propose so-called third generation (3G) and beyond (i.e., 3.5G, 4G, etc.) data networks that include extensive mobile Internet access by wireless, mobile node devices including cellular phones, personal digital assistants (PDA's), handheld computers, and the like. (See http://www.itu.int).

Unlike previous wireless networks, the proposed fourth generation and beyond networks are entirely IP based, i.e., all data is communicated in digital form via standard Internet addressing and routing protocols from end to end. However, unlike current fixed node networks, in the proposed third generation and beyond wireless, mobile access networks, wireless mobile nodes are free to move about within the network while remaining connected to the network and engaging in data communications with other fixed or mobile network nodes.

Among other things, such networks must therefore provide facilities for dynamic rerouting of data packets between the communicating nodes. The current Internet addressing and routing protocols and schemes, which are based on fixed IP addresses and fixed node relationships, do not provide such facilities. Similarly, current fixed node Internet protocols are not sufficient for wireless LAN usage.

Real-time applications such as VoIP usually have strict requirements over the end-to-end QoS from the mobile node all the way to the correspondent node. It is therefore necessary to ensure QoS requirements are met from source to destination and vice-versa, not just on portions of the path. The existing handoff trigger mechanisms in wireless communication systems are all essentially based on measurements of layer 2 QoS parameters over the wireless link only (BER—bit error rate, SNR—signal-to-noise ratio, etc.). Unfortunately, this measurement does not cover the path to the correspondent node in its entirety.

With circuit-switched core networks in current wireless communication systems, measurements of layer 2 QoS parameters over the wireless link only is sufficient to decide to which access point to handoff the wireless communication device. This is because the circuit-switched core network is robust and well provisioned to provide reliable and stable service. In that case, the wireless link is the only bottleneck in the end-to-end path and it is appropriate to base the handoff trigger on QoS measurements on that portion of the communication path.

As set forth generally above, next generation wireless communication systems will be based on an all-IP infrastructure, especially the core network. As such, these wireless communication systems will lose the robustness and reliability that was provided by circuit-switched networks thereby making the fixed hop of the end-to-end path from mobile to correspondent node a possible bottleneck, just like the wireless hop or link. To that end, using the existing layer 2 QoS measurements to determine handoff triggers, which do not estimate QoS on the fixed hop as well as the wireless hop, will lead to re-establishment of ongoing real-time sessions on paths where the end-to-end QoS requirements are not satisfied.

As such, a need exists in wireless communication systems that use an all-IP infrastructure for a handoff trigger that is based on the QoS experienced on the entire communication path between the wireless communication device and the correspondent node.

SUMMARY OF THE INVENTION

A preferred embodiment of the present invention discloses a method for providing a triggering mechanism in an all-IP wireless communication system. This method includes the steps of probing a plurality of communication paths between a mobile terminal and a correspondent node to obtain at least one QoS parameter associated with each said communication path; identifying each communication path that provides a predetermined acceptable level of performance; and generating a handoff trigger to the communication path that provides the highest level of performance to the mobile terminal.

Yet another preferred embodiment of the present invention discloses a method and system for providing a triggering mechanism for a mobile terminal in an all-IP wireless communication system. The preferred method comprises the steps of: probing a plurality of AP/R pairs with the mobile terminal to obtain at least one QoS parameter that is defined by a communication traffic path between the mobile terminal and a correspondent node; classifying each AP/R pair into a group that passes a predefined QoS requirement associated with the QoS parameter; ranking the group according to a predicted level of performance by quantifying the QoS parameter; and generating a handoff trigger directing the mobile terminal to hand off to the AP/R pair providing the highest QoS to the mobile terminal.

In the preferred embodiment, the at least one QoS parameter is selected from a group of QoS parameters consisting of packet delay, packet jitter, packet loss and bandwidth on an end-to-end path. In addition, in one embodiment the first group is ranked using a weighted-based ranking. In yet another embodiment, the first group is ranked using a perception-based ranking.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS

Figure 1:
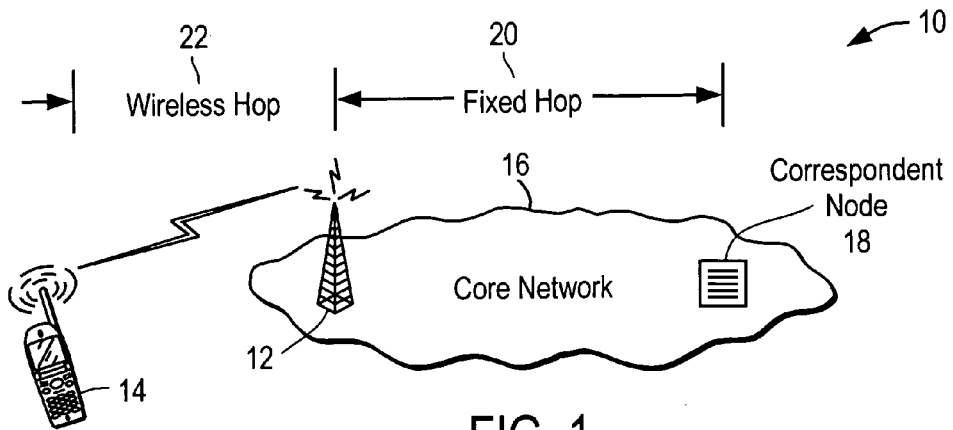
FIG. 1 generally illustrates an all-IP wireless communication system with one wireless hop and a fixed hop to the correspondent node.

Referring to FIG. 1, the present invention discloses a handoff triggering mechanism for an all-IP wireless communication system that is suitable for real-time applications such as VoIP. The preferred handoff triggering mechanism supports real-time applications in all-IP heterogeneous wireless communication systems (cellular, wireless, LAN, IEEE802.11, Bluetooth). The preferred embodiment is based on layer 3 QoS evaluation and comparison of different candidate base stations 12 or access points of the all-IP wireless communication system 10. The comparison is in terms of the capability of the base station 12 to support end-to-end QoS requirements of real-time sessions after handoff. The resulting trigger can be used by a handoff mechanism at any layer such as layer 2, layer 3 or both.

As illustrated in FIG. 1, the preferred wireless communication system 10 generally includes the base station 12, a mobile terminal 14, a core network 16 and a correspondent node 18. For the purpose of the present invention, the mobile terminal 14 should be construed to include any type of wireless communication device such as a wireless telephone, personal digital assistant (PDA) or miniature-computing device. Those skilled in the art would recognize that various types of communication devices may take the form of the mobile terminal 14.

Figure 2:
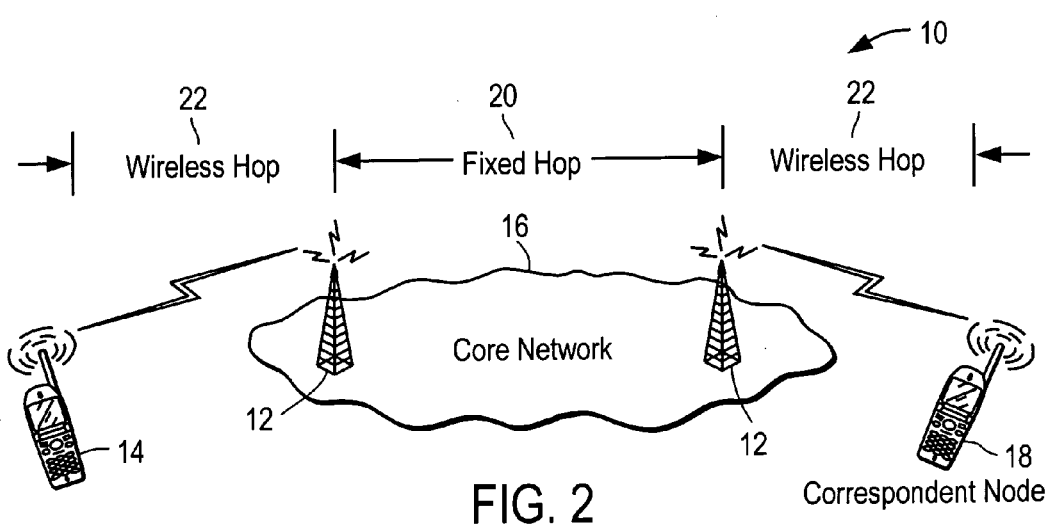
FIG. 2 generally illustrates an all-IP wireless communication system with two wireless hops and a fixed hop from the mobile terminal to the correspondent node.

For a communication session in the all-IP wireless communication system 10, the end-to-end traffic path will include a fixed hop 20 (the wired link) and at least one wireless hop 22 (two hops if both endpoints are mobile wireless devices). In the embodiment illustrated in FIG. 1, the fixed hop 20 is used to connect the mobile terminal 14 to the correspondent node 18, which is a land-based communication device. An example of a wireless communication environment that illustrates an end-to-end traffic path with two wireless hops 22 is illustrated in FIG. 2. As depicted, in this wireless communication environment the correspondent node 18 is also a wireless mobile terminal that is used to communicate with mobile terminal 14. As such, the end-to-end traffic path illustrated in FIG. 2 includes a fixed hop and two wireless hops.

The preferred embodiment of the present invention is directed toward improving mobility management by focusing on triggering. The major steps of mobility management include: (1) triggering, whereby a handoff decision is made, including the choice of the next access point, access router, or both; (2) signaling to deliver the trigger; and (3) handoff, to establish the new link. As set forth above, the present invention focuses on triggering, which is the selection of the next point of attachment for mobile terminal 14 during a handoff. The trigger is used to initiate signaling and to pass the necessary information to the new base station 12 to complete the move to the new point of attachment.

In the preferred embodiment, the handoff triggering mechanism is moved to layer 3 and is based on layer 3 QoS measurements, which generally include packet delay, packet loss, packet jitter and link bandwidth. Using the layer 3 QoS measurements allows the present invention to cover the entire end-to-end path from the mobile terminal 14 to the correspondent node 18. As generally set forth above, the end-to-end path will include the wireless hop 22, the fixed hop 20 and possibly a second wireless hop 22 to reach the correspondent node 18.

Figure 3:
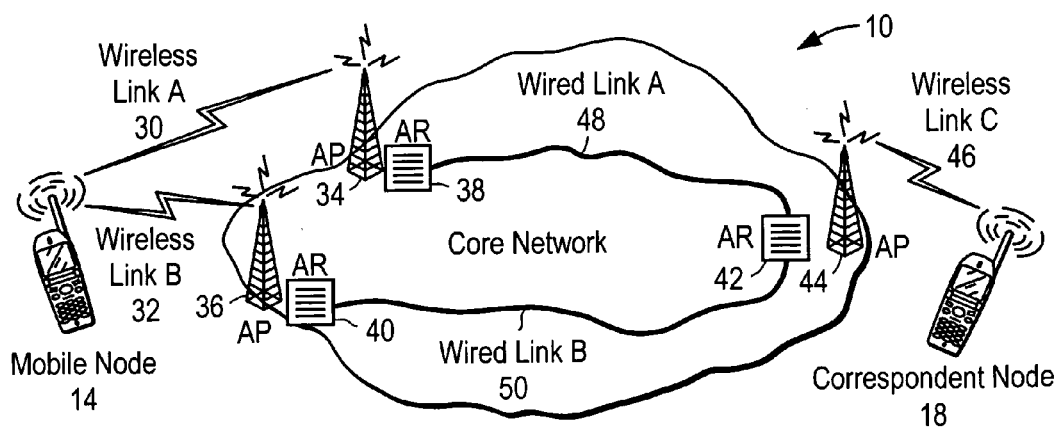
FIG. 3 is a detailed illustration of a preferred all-IP wireless communication of the present invention.

Referring to FIG. 3, the preferred all-IP wireless communication system 10 illustrated in FIG. 1 is set forth in greater detail as it relates to the present invention. The preferred wireless communication system 10 includes a mobile terminal 14 that is connected through a plurality of wireless links 30, 32 to a plurality of access points 34, 36 of the core network 16. As illustrated, each respective wireless link 30, 32 is associated with a respective access point 34, 36, which preferentially comprise base stations in the preferred embodiment. Further, each respective access point 34, 36 is connected to a corresponding router 38, 40. For the purpose of the present invention, respective access points and their corresponding routers will be referred to herein as access point/router pairs (AP/R pairs).

During operation, the routers 38, 40 forward data packets from wirelessly connected mobile terminals 14 to respective correspondent nodes 18. In other words, in the present invention, each access router is used to forward data packets to other access routers located in the core network 16. Using routing tables and routing protocols, access routers read the network address in each transmitted frame and make a decision on how to send it based on the most expedient route (traffic load, line costs, speed, bad lines, etc.). Routers work at layer 3 in the protocol stack, whereas access points 34, 36 work at layer 2.

As used herein, layer 3 refers to the Internet Protocol (IP) layer in the TCP/IP Reference Model stack. Layer 3 is also called the "network layer" and contains the address that is inspected by the router 38, 40, 42 as data is transmitted through the core network 16. The IP layer accepts packets and prepares them for the data link protocol layer by turning the IP addresses into physical station addresses (MAC addresses) and fragments the packets (if necessary) into the required frame size. The IP outputs packets, which are sometimes referred to as "datagrams," and each datagram is prefixed with an IP header that contains source and destination IP addresses. If the IP has to fragment the packet, it creates multiple datagrams with sequence numbers so that they can be reassembled by the IP on the receiving end.

During operation, the IP hands over each datagram to layer 2 along with the MAC addresses of the correspondent node 18 or next router 38, 40, 42. Layer 2 is then responsible for moving the data across the wireless link 30 or the wired link 48. Layer 2 provides the set of function and mechanisms capable of physically transmitting (together with Layer 1) information provided by higher layers. In the case of the wireless link 30, it refers to the radio signal on the wireless link from the 20 mobile terminal 14 to the base station 12. The IP is used to route the packets from network to network. Routers 38, 40, 42 contain routing tables that move the datagram to the next "hop," which is either the destination network or another router 38, 40, 42. Datagrams can traverse several routers 38, 40, 42 in the core network 16 before they reach the destination network mode.

As further illustrated in FIG. 3, each respective router 38, 40 that is connected to a respective mobile terminal 14 is also connected to at least one router 42 that is also connected to the correspondent node 18 through other routers of the core network 16. In the embodiment illustrated in FIG. 3, the correspondent node 18 is connected to a wireless access point 44, which comprises a base station that is connected to the correspondent node 18 through a wireless link 46. However, although not illustrated in FIG. 3, those skilled in the art should recognize that the correspondent node 18 does not necessarily have to be connected to the access router 42 through a wireless link 46, as the present invention also supports wired correspondent nodes 18 as depicted in FIG. 1 as well. In the embodiment illustrated in FIG. 3, each respective router 38, 40, 42 is interconnected via a plurality of wired links 48, 50 of the core network 16.

Figure 4:
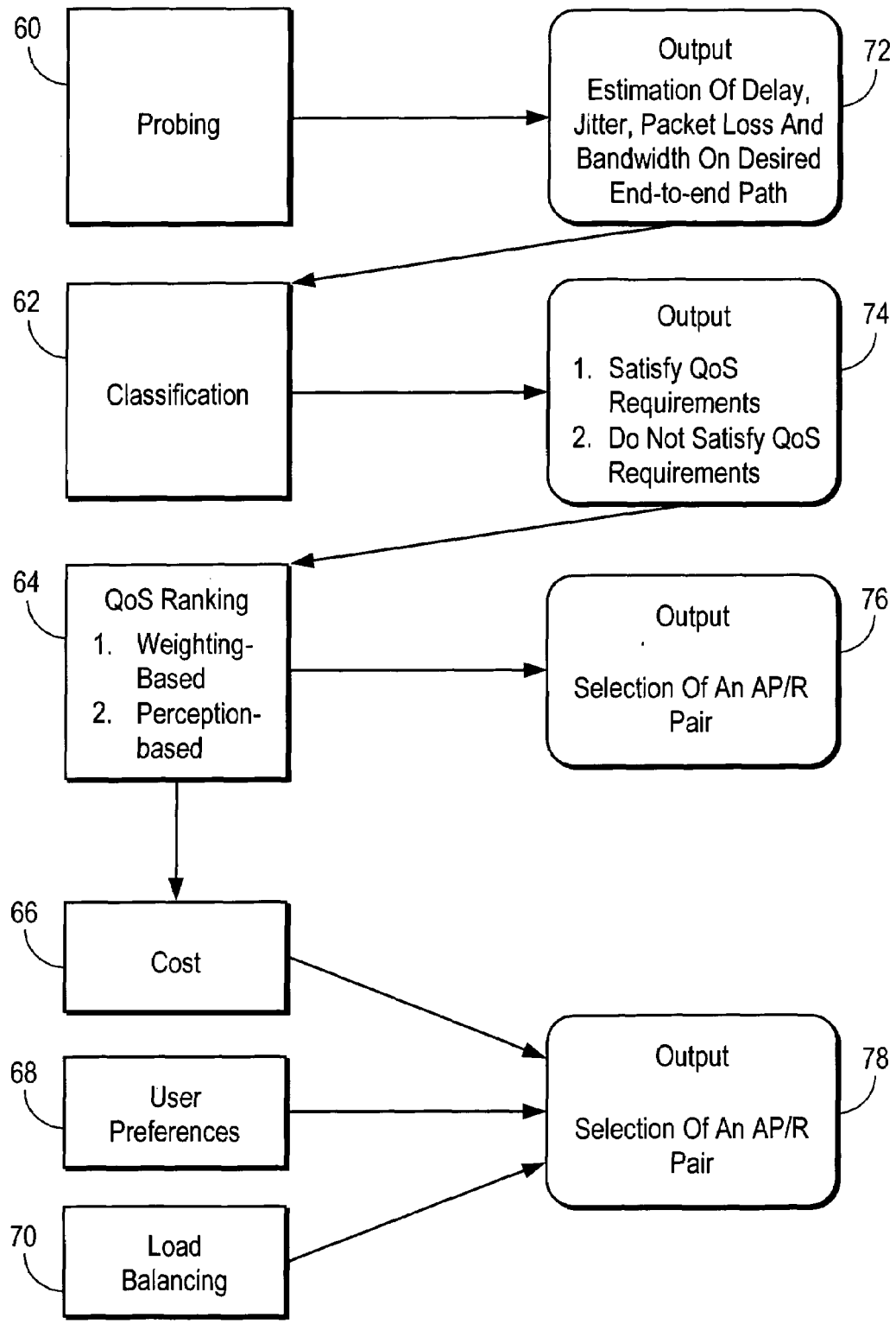
FIG. 4 illustrates the method steps of the preferred triggering mechanism that is disclosed by the present invention for the all-IP wireless communication system.

In the preferred embodiment of the present invention, the handoff trigger is based on layer 3 QoS measurements that can be used to initiate handoffs at layer 2 or 3, or both. Referring to FIG. 4, the preferred triggering mechanism consists of three steps: 1) a probing step 60—gathering QoS parameter statistics for the desired end-to-end path between the mobile terminal 14 and the correspondent node 18; 2) a classification step 62—classifying AP/R pairs into two groups (i.e.—those that can support the required VoIP QoS standards and those that cannot); and 3) a ranking step 64—ranking the AP/R pairs that satisfy the QoS requirements in order of capability to provide better QoS and selecting the first pair on the list, certainly the most optimum statistics. In the preferred embodiment, the first pair on the resulting list will be designated for the handoff trigger because that particular AP/R pair will provide the best QoS for the mobile terminal 14.

As further illustrated in FIG. 4, in yet another preferred embodiment of the present invention, the mobile terminal 14 trigger mechanism uses the results of the above-referenced steps as part of an input to a selection algorithm. The other inputs to the selection algorithm may include cost factors 66, user preferences 68, load balancing 70 and various other considerations (not illustrated). As such, in this embodiment of the present invention, one AP/R pair will be selected from the group that supports the required QoS standards depending on a further consideration of the above-referenced variables.

As set forth generally above, the first step in the preferred triggering mechanism is the probing step 60, which is the process of probing all access points 34, 36 and routers 38, 40 within radio range of the mobile terminal 14. Only two access points 34, 36 and routers 38, 40 are illustrated in FIG. 4; however, those skilled in the art should recognize that several may be available in the preferred embodiment. The purpose of this step is to gather QoS parameter statistics for the end-to-end path from the mobile terminal 14 to the correspondent node 18. As previously set forth, the handoff triggering mechanism is based on layer 3 QoS measurements, which include packet delay, packet loss, packet jitter and link bandwidth on the end-to-end path between the mobile terminal 14 and the correspondent node 18. As such, in the preferred embodiment of the present invention, the probing step 60 is preferentially designed to generate a probing output 72 that includes sample measurements of all of the QoS parameters for each candidate AP/R pair in radio range of the mobile terminal 14.

In the preferred embodiment of the present invention, when the current access point and router that the mobile terminal 14 is using no longer satisfies the required QoS standards, at least one dummy traffic channel is created with the mobile terminal 14 having similar characteristics to VoIP radio traffic. The dummy traffic channel is created to all access points 34, 36 and routers 38, 40 within radio range of the mobile terminal 14. See FIG. 3. The purpose of creating dummy traffic with characteristics theoretically similar to that of a voice channel is to simulate the typical traffic flow conditions that the chosen AP/R pair will experience if they are selected by the preferred triggering mechanism.

The traffic on the dummy traffic channel is shaped similarly to the theoretical characteristics of VoIP traffic in terms of packet size, overhead, bandwidth and packet inter-departure delay. As such, the dummy traffic channel is used to simulate typical VoIP traffic between the mobile terminal 14 and the correspondent node 18. During transmission, measurements of the layer 3 QoS parameters of interest are taken and then weighted or averaged to obtain a single representative output per QoS parameter. In another embodiment, probing traffic that does not necessary match the characteristics of voice traffic, but is just sent to obtain an estimate of the 4 QoS parameters may be used.

As set forth generally above, after the probing outputs 72 are obtained from the probing step 60, they are classified into two groups with the classification step 62. Classification is based on the end-to-end layer 3 QoS requirements of the real-time application of interest. For instance, the QoS requirements of VoIP vary depending on the coding scheme used. The two groups in which the respective AP/R pairs are classified consist of AP/R pairs that satisfy all the QoS requirements and AP/R pairs that do not satisfy the QoS requirements. A resulting classification output 74 is generated by the classification step 62 that is sent to the ranking step 64. The classification output 74 contains a list of respective AP/R pairs that meet the QoS requirements and those that do not meet the QoS requirements.

By way of example only, for the ITU G.729 coder, the QoS requirements currently defined are as follows: 1) One-way latency $\leq$150 msec; 2) Jitter (packet inter-arrival time) $\leq \pm$50 msec; 3) Packet loss$\leq$2%; and 4) Bandwidth (serialization speed onto the link)$\geq$8 kbps. As such, as it relates to the present invention, AP/R pairs that provide QoS measurements from the probing step 60 that satisfy all the above-referenced QoS requirements are categorized into a "passed test" grouping, and those that do not are classified into a "failed test" grouping.

As illustrated in FIG. 4, the next step of the preferred triggering mechanism is the ranking step 64, which ranks the respective AP/R pairs that meet the QoS requirements in order to provide better QoS to the mobile terminal 14. The ranking step 64 uses elements from the "passed test group" of output 74, which is the result of the classification step 62. The AP/R pairs that do not satisfy the QoS requirements are preferentially ignored by the mobile terminals 14 in the preferred embodiment of the present invention.

As a result of the ranking step 64, a ranking output 76 is generated that is preferentially represented as a single number for each AP/R pair, thereby providing an assessment of their respective overall QoS capability in the form of a scalar number. The scalar number, referred to herein as a QoS_Quantifier, allows a comparison and ranking among different AP/R pairs. Obviously, the AP/R pair with the highest ranking is preferably selected for the handoff and, thus, a resulting output of the triggering mechanism is generated that causes the mobile terminal 14 to handoff to the AP/R pair with the highest ranking.

In the preferred embodiment of the present invention, the ranking step 64 uses one of two preferred methods to generate a ranking output 76, which include a weighted-based QoS ranking and a perception-based QoS ranking. The weighted-based QoS ranking method uses the single representative values obtained by the probing step 60 for each QoS parameter to define a k-dimensional space, where k is the number of QoS parameters and where each normalized representative parameter value is a coordinate in that space. Normalization is achieved versus the values given by the QoS requirements of the real-time application in such a way that values closer to zero denote better performance along with compliance with the QoS requirements, and values above 1 identify unacceptable performance.

The set of normalized parameter values for each candidate AP/R pair constitutes the vector QoS_Tuple[n], where n is the number of QoS parameters. The region in space limited by variation between 0 and 1 on each axis defines a region of acceptable QoS. Since each QoS_Tuple defines a point in the space, the present invention calculates the point's distance to the point of minimum acceptable QoS, per the requirements, i.e., whose coordinates are all equal to 1. This distance is the QoS_Quantifier and greater distances denote better QoS. The QoS_Quantifier is defined as follows: with n being the number of QoS parameters, j the number of candidate AP/R pairs, and $\alpha_{i,j}$ the weight given to QoS_Tuple[i] for $$AP/R_j, \text{QoS\_Quantifier} = \sqrt{\sum_{i=1}^{n} \{\alpha_{i,j}(1 - \text{QoS\_Tuple}_j[i])\}^2}.$$

In the preferred embodiment of the present invention, the weights $\alpha_{i,j}$ depend on the real-time application under consideration, for example, in voice delay is more important than bandwidth, etc. These weights will give a measure of how much each parameter is more important than the rest. We have: $0 \leq \alpha_i \leq 1$. And for voice we have: $0 \leq \text{QoS\_Quantifier}_i \leq 4$.

The perception-based QoS ranking method attempts to normalize the measured QoS parameter values to user perception. For that purpose, the present invention assumes the existence of data relating each of the QoS parameters, by itself, to a subjective measurement scale such as MOS (Mean Opinion Score, scale of 1–5) for voice (similar subjective assessment scales have been defined by ITU for image and multimedia transmission). For example, for ITU's G.729, such data is available.

Once measurements taken from the probing step 60 are combined through averaging or weighting, such as described in the probing step 60, the MOS value corresponding to each QoS parameter can be obtained from the data described above. The MOS values corresponding to the different QoS parameters constitute a set. The present invention chooses the lowest MOS of this set to be the QoS_Quantifier value for the AP/R pair under consideration. In this preferred embodiment of the present invention, a higher QoS_Quantifier denotes better QoS and, as such, the handoff trigger is programmed to hand off the mobile terminal 14 to a respective AP/R pair that has the highest QoS_Quantifier.

By way of example only, the discussion below goes through a step-by-step illustration of the preferred embodiments of the present invention. For this example, the VoIP QoS requirements for ITU's G.729 coder will be used. The QoS requirements for VoIP applications using the G.729 coder are defined as follows: 1) One-way delay≦150 ms; 2) Jitter 50 msec; 3) Packet loss≦2%; and 4) bandwidth≧8 kbps.

As set forth above, the first preferred step performed by the mobile terminal 14 is the probing step 60. During operation, the mobile terminal 14 obtains multiple measurement values for each QoS parameter during the probing period, which are combined through averaging or weighting (e.g.—giving larger weights to more recent measurements). As such, for each candidate AP/R pair, each QoS parameter will be represented by one value. For the purpose of the present example, assume the results set forth in the table below were obtained from the probing step 60 from three AP/R pairs:

| AP/R Pair | QoS Parameter | | | |
|---|---|---|---|---|
| | End-to-End Layer 3 Delay | End-to-End Layer 3 Jitter | End-to-End Layer 3 Packet Loss | End-to-End Layer 3 Bandwidth |
| 1 | 200 msec | 50 msec | 3% | 15 kbps |
| 2 | 80 msec | 40 msec | 1% | 40 kbps |
| 3 | 100 msec | 40 msec | 0.5% | 40 kbps |

The probing outputs 72 of the probing step 60 are then applied to the classification step 62. Based on the results given in the above-referenced table, the candidate AP/R pairs are classified into two groups: 1) Group 1 (at least one QoS requirement not met); and 2) Group 2 (all QoS requirements met). In the present example, only Pair 2 and Pair 3 will be placed in Group 2 and will be considered because these are the only pairs for which all QoS requirements are met. Pair 1 does not meet the QoS requirements because both the delay and the packet loss requirements are not met.

After the classification output 74 is generated, the resulting values are then processed by the ranking step 64 for each candidate AP/R pair that passes the classification step 62. In the preferred embodiment of the present invention, the ranking step 64 uses one of two preferred methods to generate a ranking output 76, which, as previously set forth, comprise a weighted-based QoS ranking and a perception-based QoS ranking. The first part of the discussion below is directed to the weighted-based QoS ranking method and the second part of the discussion is directed to the perception-based QoS ranking method as both relate to the present example.

The weighted-based QoS ranking method uses the results obtained for Pair 2 and Pair 3 from the probing step 60 that are set forth in the table above to normalize each parameter against its corresponding QoS requirement. Applying the technique to Pair 2 and Pair 3, each parameter would be normalized as follows:

QoS_Tuple$_2$[4]={80 msec/150 msec, 40 msec/50 msec, 1%/2%, 8 kbps/40 kbps};
QoS_Tuple$_3$[4]={100 msec/150 msec, 40 msec/50 msec, 0.5%/2%, 8 kbps/40 kbps} where the order is {delay, jitter, loss and bandwidth}. Note that the bandwidth ratio is inverted compared to the rest of the parameters since higher bandwidth is more desirable.

For the purpose of this invention, assume the following weighting vector is specified for voice: $\alpha_1$=[1, 0.3, 0.5, 0.1]. Using the equation set forth above, the following results are obtained: Pair 2: QoS_Quantifier$_2$=0.856667; Pair 3: QoS_Quantifier$_3$=0.848333. As such, in this example, the mobile terminal 14 would be triggered to handoff to Pair 2 since a higher QoS_Quantifier denotes better QoS performance.

The perception-based QoS ranking method also uses the results obtained for Pair 2 and Pair 3 from the probing step 60 set forth in the table above to create MOS values corresponding to the layer 3 QoS parameters. Using Pair 2 and Pair 3, since these represent the only AP/R pairs that passed the classification step 62, assume the following MOS values corresponding respectively to the given values of delay, jitter, packet loss and bandwidth were obtained:

| AP/R Pair | MOS(.) | | | |
|---|---|---|---|---|
| | End-to-End Layer 3 Delay | End-to-End Layer 3 Jitter | End-to-End Layer 3 Packet Loss | End-to-End Layer 3 Bandwidth |
| 2 | 3.3 | 3.2 | 3.4 | 4.9 |
| 3 | 3.1 | 3.2 | 3.6 | 4.9 |

The table set forth above illustrates that for Pair$_2$, the minimum MOS is 3.2 whereas it is 3.1 for Pair$_3$. In this example, the resulting QoS_Quantifiers are therefore: QoS_Quantifier$_2$=3.2 and QoS_Quantifier$_3$=3.1. To that end, this preferred embodiment will also trigger handoff of the mobile terminal to Pair 2. because this respective AP/R pair has a higher QoS_Quantifier.

Referring once again to FIG. 4, another preferred embodiment of the present invention is directed toward using the ranking output 76 as an input to a selection algorithm that is ultimately used to trigger the handoff of the mobile terminal 14. As previously set forth, the selection algorithm may take into account various factors, such as cost considerations, user preferences and load balancing considerations. In this embodiment, a selection algorithm output 78 is generated that is used to trigger handoff of the mobile terminal 14 to the next acceptable AP/R pair.

To avoid instability and frequent handoffs, another preferred embodiment of the present invention can set two thresholds $T_1$ and $T_2$. If the QoS_Quantifier through the current AP/R pair crosses $T_1$ (VoIP traffic flowing through the current AP/R pair can be monitored for QoS performance), measurements to all AP/R pairs within radio range will begin. However, unless at least one of the new candidates has a QoS_Quantifier that satisfies $T_2$, no handoff will be initiated.

The trigger is QoS-Aware.

Another preferred embodiment of the present invention is directed toward providing probing traffic reduction that is created by the mobile terminal 14 for the purposes of performing the probing step 60. As previously set forth, in order to obtain the actual QoS parameters being experienced by the mobile terminal 14, a dummy traffic channel is created between the mobile terminal 14 and all access points within radio range of the mobile terminal 14. The present invention preferentially uses one or more methods to reduce probing traffic including: 1) "Early AP inadequacy detection", 2) "Selective probing"; and 3) "Caching."

The first method is based on the fact that end-to-end QoS requires adequate performance on all path portions. Using radio signal strength as layer 2 side information, the present invention can avoid probing access routers that are connected to access points that have very bad radio signal power at the mobile terminal 14. The second method is based on the assumption of independence between the wireless and core network hops. For the case of several access points connected to the same access router, only one probing flow will be initiated between the access router and the correspondent node 18, while a separate flow is created to each of the access points. The results are then combined at the access router. The same can be done for the case of multiple access routers connected to the same access point. The last proposal is based on the assumption of caching (with timeout) of QoS parameters relating to next hop links at different routers to reduce required dummy packets.

While the invention has been described in its currently best-known modes of operation and embodiments, other modes, embodiments and advantages of the present invention will be apparent to those skilled in the art and are contemplated herein.

What is claimed is:

1. A method for providing a triggering mechanism in an all-IP wireless communication system, comprising:
   probing a plurality of end-to-end communication paths between a mobile terminal and a correspondent node to obtain at least one QoS parameter associated with each said communication path;
   identifying each said communication path that provides a predetermined acceptable level of performance; and
   generating a handoff trigger to said communication path that provides the highest level of performance to said mobile terminal.

2. The method of claim 1, wherein said at least one QoS parameter is selected from a group of QoS parameters consisting of packet delay, packet jitter, packet loss and bandwidth.

3. The method of claim 1, further comprising ranking each said communication path according to a predicted level of performance.

4. The method of claim 3, wherein ranking is performed using a weighted-based ranking.

5. The method of claim 3, wherein ranking is performed using a perception-based ranking.

6. The method of claim 1, wherein said correspondent node comprises a fixed terminal.

7. The method of claim 1, wherein said correspondent node comprises a mobile terminal.

8. The method of claim 1, further comprising considering a cost factor.

9. The method of claim 1, further comprising considering a user preference setting on said mobile terminal.

10. The method of claim 1, further comprising considering load balancing on said all-IP wireless communication system.

11. The method of claim 1, wherein the at least one QoS parameter comprises a layer 3 QoS evaluation parameter corresponding to each said end-to-end communication path.

12. A method for providing a triggering mechanism in an all-IP wireless communication system, comprising:
   establishing a plurality of end-to-end communication paths between a mobile terminal and a correspondent node;
   obtaining at least one QoS parameter for each said end-to-end communication path;
   identifying each said end-to-end communication path that satisfies a predetermined acceptable level of performance; and
   generating a handoff trigger to said end-to-end communication path that provides the highest QoS to said mobile terminal.

13. The method of claim 12, wherein said at least one QoS parameter is selected from a group of QoS parameters consisting of packet delay, packet jitter, packet loss and bandwidth.

14. The method of claim 12, further comprising ranking each said communication path according to a predicted level of performance.

15. The method of claim 14, wherein ranking is performed using a weighted-based ranking.

16. The method of claim 14, wherein ranking is performed using a perception-based ranking.

17. The method of claim 12, wherein said correspondent node comprises a fixed terminal.

18. The method of claim 12, wherein said correspondent node comprises a mobile terminal.

19. The method of claim 12, wherein the at least one QoS parameter comprises a layer 3 QoS evaluation parameter corresponding to each said end-to-end communication path.

20. A method for providing triggering mechanism in an all-IP wireless communication system, comprising:
   providing a mobile terminal connected to a plurality of AP/R pairs;
   obtaining for each AP/R pair at least one QoS parameter that is defined by an end-to-end communication path between said mobile terminal and a correspondent node;
   identifying each said AP/R pair that passes a predefined QoS requirement associated with said QoS parameter;
   ranking said AP/R pairs according to a predicted level of performance using said at least one QoS parameter; and
   generating a handoff trigger directing said mobile terminal to hand off to said AP/R pair providing a highest QoS to said mobile terminal.

21. The method of claim 20, wherein said at least one QoS parameter is selected from a group of QoS parameters consisting of packet delay, packet jitter, packet loss and bandwidth.

22. The method of claim 20, wherein ranking is performed using a weighted-based ranking.

23. The method of claim 20, wherein ranking is performed using a perception-based ranking.

24. The method of claim 20, wherein said correspondent node comprises a fixed terminal.

25. The method of claim 20, wherein said correspondent node comprises a mobile terminal.

26. The method of claim 20, wherein the at least one QoS parameter comprises a layer 3 QoS evaluation parameter corresponding to each said end-to-end communication path.

* * * * *